June 6, 1939. F. B. CRITCHLOW 2,161,457
INDICATING DEVICE FOR AUTOMOBILES
Filed March 14, 1938
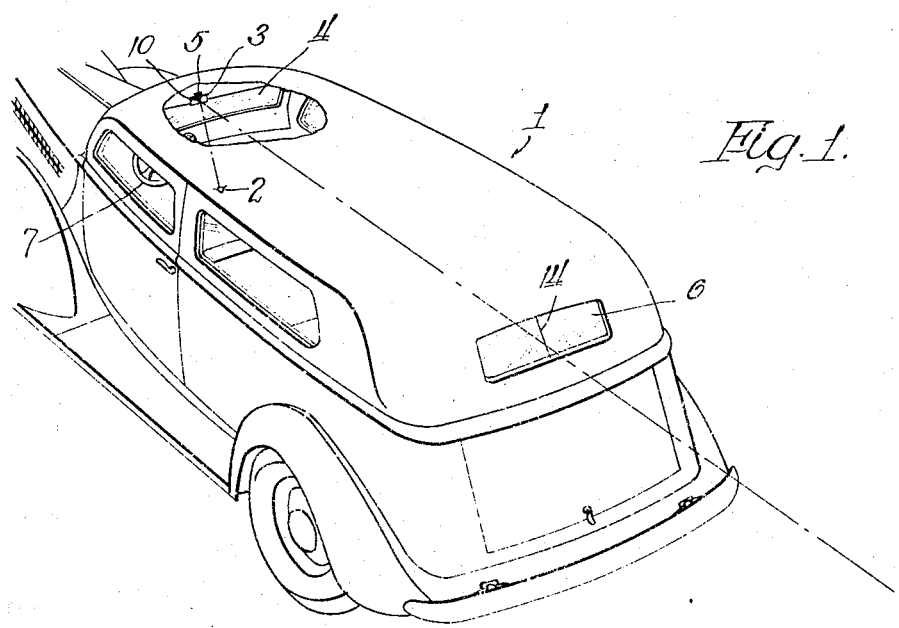
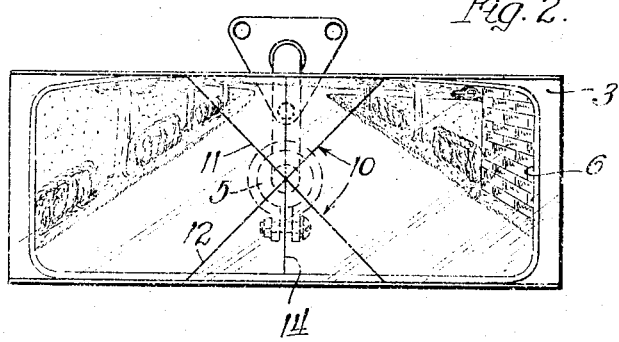
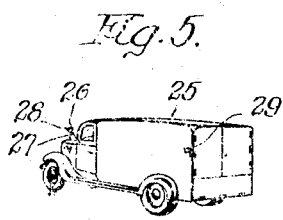
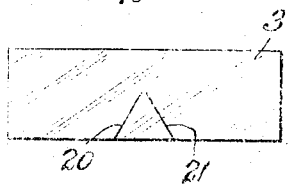
Inventor
Francis B. Critchlow Patented June 6, 1939

2,161,457

UNITED STATES PATENT OFFICE 2,161,457

INDICATING DEVICE FOR AUTOMOBILES

Francis B. Critchlow, Los Angeles, Calif.

Application March 14, 1938, Serial No. 195,709

3 Claims. (Cl. 88—2.2)

The present invention relates generally to sighting guides to enable the driver of an automobile or other vehicle to determine the path of travel of the vehicle, and the principle object of this invention is the provision of means enabling the driver to use the rear vision mirror and gauge with considerable accuracy the travel of the car when driving backwardly.

Road sights and the like for gauging forward travel, and more particularly to enable the car to be driven close to a curb to comply with parking requirements and the like, have been proposed heretofore, but so far as I am aware no means has heretofore been provided to enable the driver of an automobile to gauge rearward travel.

Backing out of garages is sometimes a difficult operation, especially when the driveway leading to the street is relatively long and narrow, and usually the driver is forced when backing his car to extend his head out of the window and look directly rearwardly while manipulating the car. In order, therefore, to enable a person to drive the car rearwardly while sitting normally in the driver's position, I have provided a sight or index on the rear vision mirrow which is adapted to be aligned with a sight at the rear of the car so that by bringing the index and sight into alignment with the line of vision reflected rearwardly by the mirror, the operator of the car is enabled to drive rearwardly substantially as accurately as forward travel and without having to shift his body into uncomfortable or unnatural positions.

More specifically, it is an object of the present invention to provide a direction indicator which includes a rear vision mirror mounted on the automobile or other vehicle at a point adjacent the front and on or near the longitudinal center line of the vehicle, with an index disposed thereon adjacent the center line, and a rear sight, which may be a vertical mark or bar extending vertically across the rear window in the center thereof, so that a line of sight from the operator's position in the car which is aligned with the index on the rear vision mirror and the vertical sight in the rear window will coincide generally with the longitudinal axis of the car and when maintained in alignment with the center of the driveway or some other object, manipulating the steering of the car to maintain this alignment will enable the operator to drive rearwardly with greater rapidity and accuracy of steering than heretofore.

These and other objects and advantages of the present invention will be apparent to those skilled in the art after a consideration of the following detailed description of the preferred embodiment, taken in conjunction with the accompanying drawing illustrating the same.

In the drawing:

Figure 1 is a perspective view of an automobile equipped with the present invention;

Figure 2 is a fragmentary view illustrating the image the driver of the automobile sees in the rear view mirror when using the present invention;

Figures 3 and 4 illustrate two modified forms of index means on the rear vision mirror; and Figure 5 shows the application of a modified form of my invention to a truck or the like.

Referring now more particularly to Figure 1, the reference numeral 1 indicates an automobile in which the present invention has been provided. The driver's position in the car is indicated at 2, and 3 indicates a rear vision mirror which is carried on the car, preferably above the windshield 4, by a swivel or pivotal support 5 disposed fairly close to the center of the mirror 3 and generally in the central portion thereof. The automobile 1 has a rear window 6, and the usual steering mechanism indicated by the steering wheel 7.

According to the present invention, disposed on the mirror 3, or at some part closely adjacent to the reflecting surface thereof, is an index indicated generally by the reference numeral 10. In the preferred form of construction an index 10 may be constructed as two cross lines 11 and 12 arranged as best shown in Figure 2. The lines 11 and 12 may be in the nature of cross hairs if desired. On the rear window 6 a vertical mark or sight 14 is provided. When the window 6 of the automobile is equipped with a central strip, this strip may be used as a rear vertical sight.

While I have shown an index or sight 10 on a rear vision mirror as in the form of crossed lines and the rear sight or index as in the form of a vertical mark or strip, it is to be understood that other forms of indices may be employed where desired, the essential feature being that such indices should be so made or constructed that they are capable of being brought laterally into alignment with a generally longitudinal line of sight extending rearwardly from the rear vision mirror at or adjacent the front of the car.

In operation, when the driver has to drive the car rearwardly, he looks into the rear vision mirror and aligns the two indices or sights 10 and 14 with the center of the driveway in rear of the car, and then steers the car to maintain this alignment. Figure 2 illustrates the relation of the two sights and the center of the roadway or some other fixed object along the desired line of travel. Preferably, the two sights 10 and 14 are disposed in the vertical longitudinal plane of the car, but where desirable or necessary, the sights 10 and 14 may be disposed to one side of said plane. By having a line joining the sights 10 and 14 disposed parallel to or in alignment with the longitudinal axis of the car, the line of sight from the operator's position 2 that is reflected rearwardly in alignment with the sights 10 and 14 indicates accurately the direction of travel of the car when backed rearwardly in a straight line.

The sights or indices 10 and 14 may take almost any desired form, so long as they are capable of being accurately aligned laterally.

Instead of having crossed lines on the rear view mirror and a vertical line or strip on the rear window, the latter may have cross lines and the mirror may have a vertical line. Also, two short inclined lines 20 and 21 (Figure 3) may be employed on the rear vision mirror, especially in connection with the rear window construction in which the center strip is of appreciable width. Figure 4 illustrates the rear vision mirror 3 as having a vertical line 22. Also, the line or other index on the rear vision mirror may be in the form of a separate device adjustably clamped to the mirror, and similarly, the index at the rear window need not be on the glass but may be in the form of a strip or other device either inside or outside of the car.

Pointers, either singly or in pairs, may be provided either for the rear vision mirror or for the rear window. While it is not necessary to have the index directly on the rear vision mirror, it is desirable to have the index as close to the reflecting surface as possible and also as close as possible to the pivot axis of the mirror, so that moving the mirror to different adjusted positions to accommodate individual drivers will not disturb the alignment of the indices with respect to the longitudinal axis of the car. Further, the index on the mirror may take the form of one or more notches.

It will be apparent that this invention is not limited in its application to passenger cars and the like or to the use of a vertical bar or mark on the rear window of the automobile or other vehicle.

Figure 5 illustrates the application of the present invention to a truck, bus, or other vehicle in which the rear view mirror is usually mounted outside the vehicle, usually at the driver's side thereof. Referring now to Figure 5, the truck or bus is indicated at 25 and is provided with a rear vision mirror 26 supported on an arm 27 secured in any suitable manner to one side of the driver's cab. The mirror 26 carries an index mark 28, which may be of any of the forms referred to above, and at the rear of the truck or bus an index or sight 29 is fastened. The parts are so arranged that when the driver looks into the mirror 26 to view the road or driveway in rear of the vehicle the line of sight passes along the indices 28 and 29, thus enabling the driver to back the vehicle in a straight line by keeping the indices 28 and 29 aligned with some object or space in the rear, substantially in the manner set forth above.

It will thus be apparent that this invention is not to be limited to the specific details shown and described above, but that, in fact, widely different means may be employed in the practice of the broader aspects of my invention.

What I claim, therefore, and desire to secure by Letters Patent is:

1. A steering gauge for a land vehicle to facilitate driving the same rearwardly in a straight line toward an observable objective in rear of the vehicle, the latter having a rear view mirror and transmission mechanism for driving the vehicle backwardly; said steering gauge comprising an index on said rear view mirror and an index fixed to the rear of the vehicle within the field of view of the driver when looking into the mirror and rearwardly to see the road in the path of rearward travel toward said objective, one of said indices extending generally vertically and the other being narrow, whereby the indices may be brought laterally into alignment, and both being disposed in a line parallel to the longitudinal axis of the vehicle so that when said indices are maintained in alignment with each other and with said objective in the line of sight of the driver the vehicle, if driven in a straight line, will travel in a direction toward said objective while the road between the latter and the vehicle is within the view of the driver.

2. A steering gauge as defined in claim 1 for a vehicle having a rear window and wherein the second index is at said window generally centrally thereof.

3. A steering gauge as defined in claim 1 wherein the rear view mirror and the first index are disposed at one side of the vehicle adjacent the forward end and the fixed index is also disposed at said one side of the vehicle adjacent the rear end in a position relative to the first index so that a line joining them is parallel to the longitudinal axis of the vehicle.

FRANCIS B. CRITCHLOW.